US006727815B2

(12) United States Patent
Röpke

(10) Patent No.: US 6,727,815 B2
(45) Date of Patent: Apr. 27, 2004

(54) FIRE ALARM SYSTEM

(75) Inventor: Gerhard Röpke, Ahrensburg (DE)

(73) Assignee: Job Lizenz GmbH Co., KG, Ahrensburg (DE)

(*) Notice: Subject to any disclaimer, the term of this patent is extended or adjusted under 35 U.S.C. 154(b) by 26 days.

(21) Appl. No.: 10/108,016

(22) Filed: Mar. 27, 2002

(65) Prior Publication Data

US 2002/0145513 A1 Oct. 10, 2002

(30) Foreign Application Priority Data

Mar. 30, 2001 (DE) .................................... 201 05 653 U

(51) Int. Cl.[7] ........................... H04Q 1/30; G08B 25/00

(52) U.S. Cl. ....................... 340/531; 340/533; 340/537; 340/539.1; 340/286.05; 340/286.96; 340/287; 340/291; 340/299; 340/307; 340/310.08

(58) Field of Search ................................ 340/506, 508, 340/533, 534, 536, 538, 537, 539, 311, 286.02, 286.05, 286.06, 287, 288, 291, 299, 307, 309.6, 310.08

(56) References Cited

U.S. PATENT DOCUMENTS 4,040,013 A * 8/1977 Carlson ...................... 340/506
4,087,803 A * 5/1978 Dransfield .................. 340/506
4,118,694 A * 10/1978 Right ......................... 340/506
4,141,007 A * 2/1979 Kavasilios et al. ......... 340/500

FOREIGN PATENT DOCUMENTS

DE 42 19 555 A1 1/1993
EP 0 803 850 A1 4/1997

* cited by examiner

*Primary Examiner*—Donnie L. Crosland
(74) *Attorney, Agent, or Firm*—Vidas Arrett & Steinkraus, P.A.

(57) ABSTRACT

A fire alarm system may comprise a control center, a wired communication pathway connected to the control center, and a relay station having a receiver and a signal evaluation circuit connected to the communication pathway. First decentralized alarm boxes may be wired to the communication pathway, and second decentralized alarm boxes may communicate with the receiver of the relay station via a wireless channel, wherein the first and second alarm boxes, in case of fire, produce an alarm signal which is transmitted to the control center via the communication pathway. A set of separate coupling modules may be disposed in the relay station and may be disconnectably connected to the signal evaluation circuit and the communication pathway via appropriate connecting elements, the coupling modules being designed for different communication modes.

10 Claims, 4 Drawing Sheets

FIRE ALARM SYSTEM

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

Fire alarm systems usually have a multiplicity of individual alarm boxes which are arranged at various locations of a building or block of buildings requiring protection and are connected to a control centre. As a rule, alarm boxes are connected to the control centre via a loop feeder or dead-end feeder where the so-called communication mode, i.e. the way signals are transmitted from the alarm boxes to the control centre and vice versa, may be based on a direct-current technique or digital signal technique. In the latter case, the communication pathway is a data bus via which digital data words are transmitted from the alarm boxes to the control centre and vice versa. The digital communication technique naturally has the advantage that a great variety of individual digital words can be transmitted. Thus, in the case of an alarm signal, not only is the signal transmitted, but also the address of the alarm box. In addition, an trouble signal may be transmitted. Conversely, the control centre may communicate with the individual alarm boxes.

The alarm boxes of such systems are push-button operated alarm boxes in the simplest case or are sensor-bound elements, possibly with an "intelligence" of their own.

As is explained in EP 0 803 850 A1 a wire-bound communication between the control centre and the individual alarm boxes does ensure high safety in communication, but makes the system relatively inflexible to changes in a room distribution once made or the function and/or occupation of rooms. Such changes normally result in the fact that individual alarm boxes need to change their location, which involves extensive and annoying installation work because of the wiring which then will be required. Even a subsequent extension of fire alarm systems by wirings between the communication pathway normally designed as a cable and the alarm boxes possibly proves to involve great expenditure. Therefore, it has been known from the aforementioned document to connect the alarm boxes to the wires of the communication pathway selectively via a wire-bound channel or a wireless channel, e.g. by means of a radio network system in the latter case. The communication pathway has coupled thereto a relay means which has a receiver for the wireless transmitting alarm boxes.

From DE 42 19 555 A1, it has been known, in conjunction with an installation facility of the building system control equipment, to connect subscriber stations and control devices to a serial bus system. It has further been known here to feed data to the bus system even without using any wires, e.g. by means of an infrared transmitter and an infrared receiver associated therewith. Wireless transmission may also be performed via other media such as a radio network or ultrasonic sound. As a rule, one receiver is triggered by several transmitters which can be in a stationary or mobile arrangement. The onboard network of the individual transmitters, as a rule, is fed from a battery which has a major or minor service life depending on the frequency at which they are actuated.

From EP 0 803 850 A1 which was mentioned earlier, it has also become known to provide two sets of alarm boxes of which one is wire-bound and the other one is connected to the communication pathway via a radio network. The individual alarm boxes equipped for radio network communication are supplied with power from a battery. The relay means has a microprocessor which converts signals received from the alarm boxes into appropriate digital signals.

It is understood that the design of the relay means is such as to provide compatibility with the communication mode on the bus. Various different communication buses have become known, even for fire alarm systems already.

Older fire alarm systems which still have been ready for operation up to now employ direct-current transmissions adopting the current-increasing or current-decreasing principle.

It is the object of the invention to provide a fire alarm system or a possibility of extending fire alarm systems that exist already wherein additional alarm boxes may be coupled to conventional wire-bound fire alarm systems in a simple manner which requires little expenditure.

BRIED SUMMARY OF THE INVENTION

According to the invention, a set of different coupling modules is provided which may selectively be disconnectably disposed in the relay means and are adapted to be connected to the signal evaluation circuit and the wire-bound communication pathway via appropriate connecting elements. The coupling modules are matched to the communication mode of the communication pathway. For example, if digital signals are transmitted the coupling module communicates with the control centre via digital signals which are adapted to be "understood" by the control centre. In contrast, if the communication pathway uses direct-current transmission the coupling module arranges for signal transmission to the control centre to be performed via a current decrease or increase according to the known technique.

Therefore, according to the inventive fire alarm system, a unitary relay means may be provided which has a receiver for the wireless reception of signals from the alarm boxes, a power supply unit, and a signal evaluation circuit. It is merely the coupling module which needs to be selected with regard to the communication mode and to be inserted into the relay means. In this way, an existing fire alarm system may be modified or supplemented by simple means with no regard to which communication mode exists on the communication pathway.

An aspect of the invention provides that the coupling modules can be connected to the signal evaluation circuit and, in case of need, to the current connection and, in case of need, to the communication pathway via a plug-and-socket connection. It is appropriate that the relay means be connected to the communication pathway via a fixed wiring. However, a possibility of connecting the coupling module in a unitary manner may be provided within the set-up of the relay means. This requires that the coupling modules should also be of a unitary structure in regard of the positions of their coupling contacts and the dimensions.

According to an aspect of the invention, the communication pathway is a direct-current line in which an alarm signal of an alarm box causes an increase in current evaluated by the control centre on the line and the coupling module has a series connection which is comprised of a switch and a resistor and is connected between the conductors of the line wherein the design of the coupling module is such as to close the switch if the signal evaluation circuit produces a control signal. Therefore, with regard to the fire alarm system, the relay means functions like a push-button fire alarm box connected to a direct-current alarm line. Such fire alarm systems still are in use in many cases. Also, it is known for older fire alarm systems equipped with sensor elements to arrange a communication also via a direct-current line by a decrease in current or increase in current.

Push-button alarm boxes which operate mechanically are manufactured in large numbers. Many of these push-button alarm boxes contain contacts and are retrofitted later with "line modules" or "communication modules" for an adaptation to certain fire alarm lines or buses. This fact is utilized by the invention by using line modules or fire alarm buses on direct-current alarm lines for an adaptation to mechanically operating push-button fire alarm boxes. Therefore, the relay means employs such a line module which then will be used for communication of the wireless alarm boxes with the communication pathway.

The embodiment mentioned last can also be an aid in determining a malfunction of the wireless-coupled alarm boxes if the coupling module has a further series connection which is comprised of a resistor and a switch, is disposed within the path of a conductor of the direct-current line, and cuts off the conductor if the module receives a trouble signal from a wireless alarm box which will then be transmitted to the control centre. However, it is impossible to identify the alarm box from which the trouble signal has emerged.

The communication pathway is a data bus in more recent fire alarm systems. Therefore, in an aspect of the invention, a suggestion is made that the coupling module should convert the signals received from the evaluation circuit into digital data words adapted to the communication mode of the data bus. It is naturally possible in such a communication that a direct signal connection is established between an individual alarm box and the control centre if the individual alarm boxes are provided with addresses. Conversely, a signal transmission may also take place from the control centre to one or all of the alarm boxes. This requires that the alarm boxes have a receiver for the signals arriving from the transmitter of the relay means. It is understood that this communication will also become active for malfunction cases.

According to another aspect of the invention, a provision is made that the coupling module be composed of two stages the first one of which is connected to the signal evaluation circuit and has a series of normally opened switches each of which is associated with one of the decentralized second alarm boxes and which are separately connected to the second stage, and the second stage of which is connected to the communication pathway designed as a data bus and produces a digital signal on the communication pathway upon closure of a switch. This aspect utilizes the fact that components in the sense of the second stage are known in conjunction with push-button fire alarm box systems. It allows communication of a push-button fire alarm box system with a control centre via a data bus. In the aspect according to the invention, switches are provided in the first stage in a way similar to push-button fire alarm boxes and will be closed if a second alarm box emits a wireless alarm signal. The arrangement of the switches is such as to match each switch to an alarm box and, therefore, it is possible to identify the alarm box via the switch which has produced an alarm signal.

Also in the embodiment described last, a trouble signal message can be verified by providing a normally closed switch in the second stage which is opened when there is a trouble signal message from the evaluation circuit. The alarm box delivering the trouble signal cannot be identified, however, in this case.

There are facilities to connect pure push-button fire alarm lines or buses in many fire alarm control centers. A fire alarm system might well happen to be exhausted with regard to the capacity of the control centre, i.e. the number of alarm boxes or lines. Therefore, it is possible to connect another communication pathway to the control centre. However, instead of using push-button fire alarm boxes, for example, radio-operated or wireless alarm boxes may be employed which will then communicate with the further communication pathway via relay means. This allows to employ radio-operated alarm boxes of a limited effective radius if the control centre is more remote from the zone being monitored. As a result, two advantages are obtained, the first one being an extension of an existing system altogether and the second one being an extension using wireless alarm boxes which require an installation expenditure which is pronouncedly lower. Also in case of newly installed fire alarm systems, there is naturally a possibility to make connectable radio-operated fire alarm boxes and relay stations, if required, in lieu of push-button fire alarm boxes.

BRIEF DESCRIPTION OF THE SEVERAL VIEWS OF THE DRAWINGS

It is understood that the switches talked about above are meant to be mechanical or electronic switches.

The inventive fire alarm system will now be explained in more detail with reference to embodiments.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
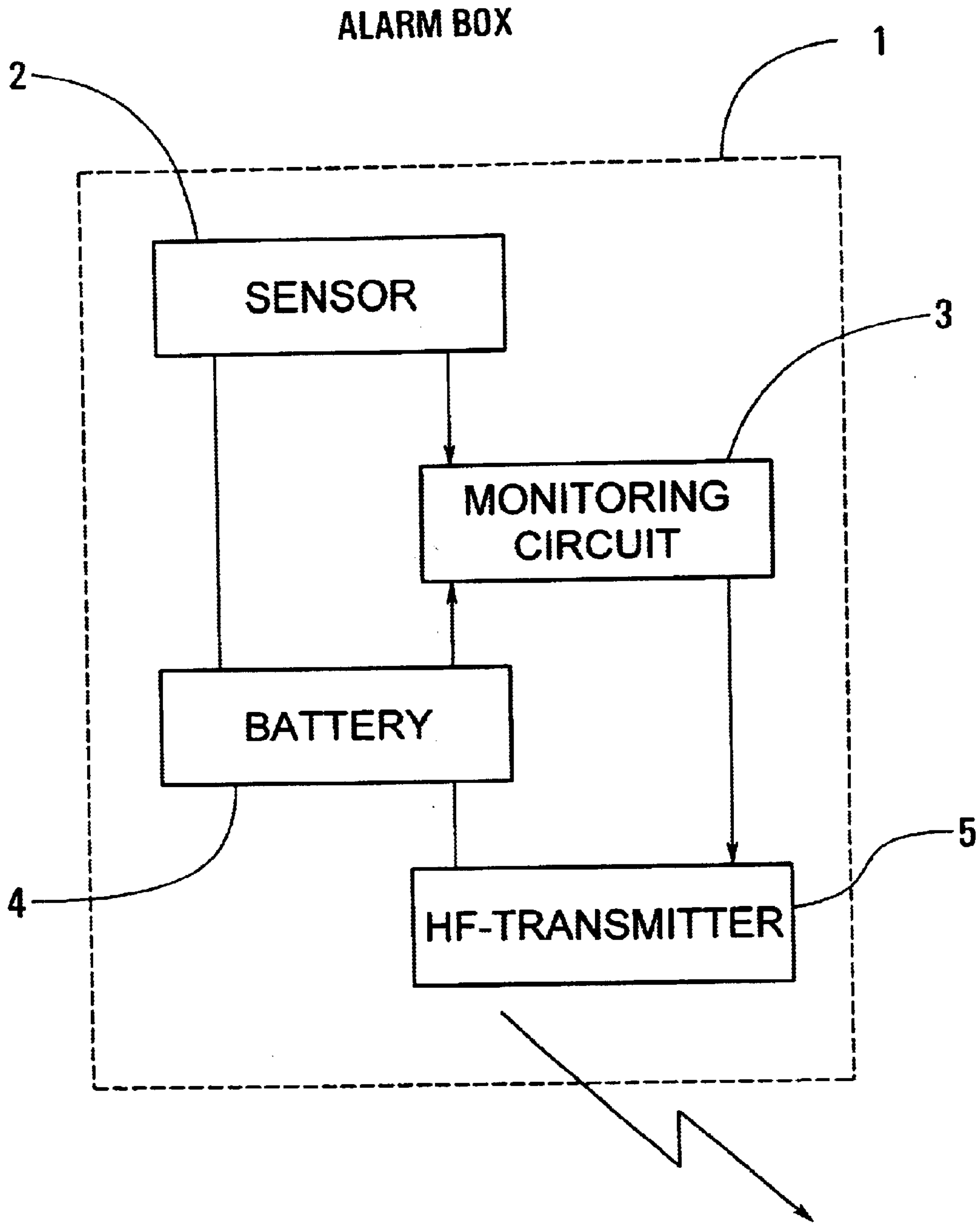
FIG. 1 shows the general set-up of a radio-operated fire alarm box.

Referring to FIG. 1, a fire alarm box 1 is shown which is adapted to communicate with an existing fire alarm system via a radio network. The alarm box includes one or more sensors which respond to fire-referenced parameters. It further provides a monitoring circuit 3 which monitors the sensor 2 and a battery 4 which feeds the sensor 2 and the evaluation circuit 3. Finally, it provides a HF transmitter 5. If the sensor 2 outputs a signal which points out the development or existence of a fire it will be evaluated in the evaluation circuit 3. Because of being triggered by the circuit 3, the transmitter 5 outputs an alarm signal to a relay station (not shown) which, in turn, is connected to a communication pathway (not shown) which leads to the control centre. A set of further fire alarm boxes (not shown either) is connected to the communication pathway in a wire-bound manner.

Figure 2:
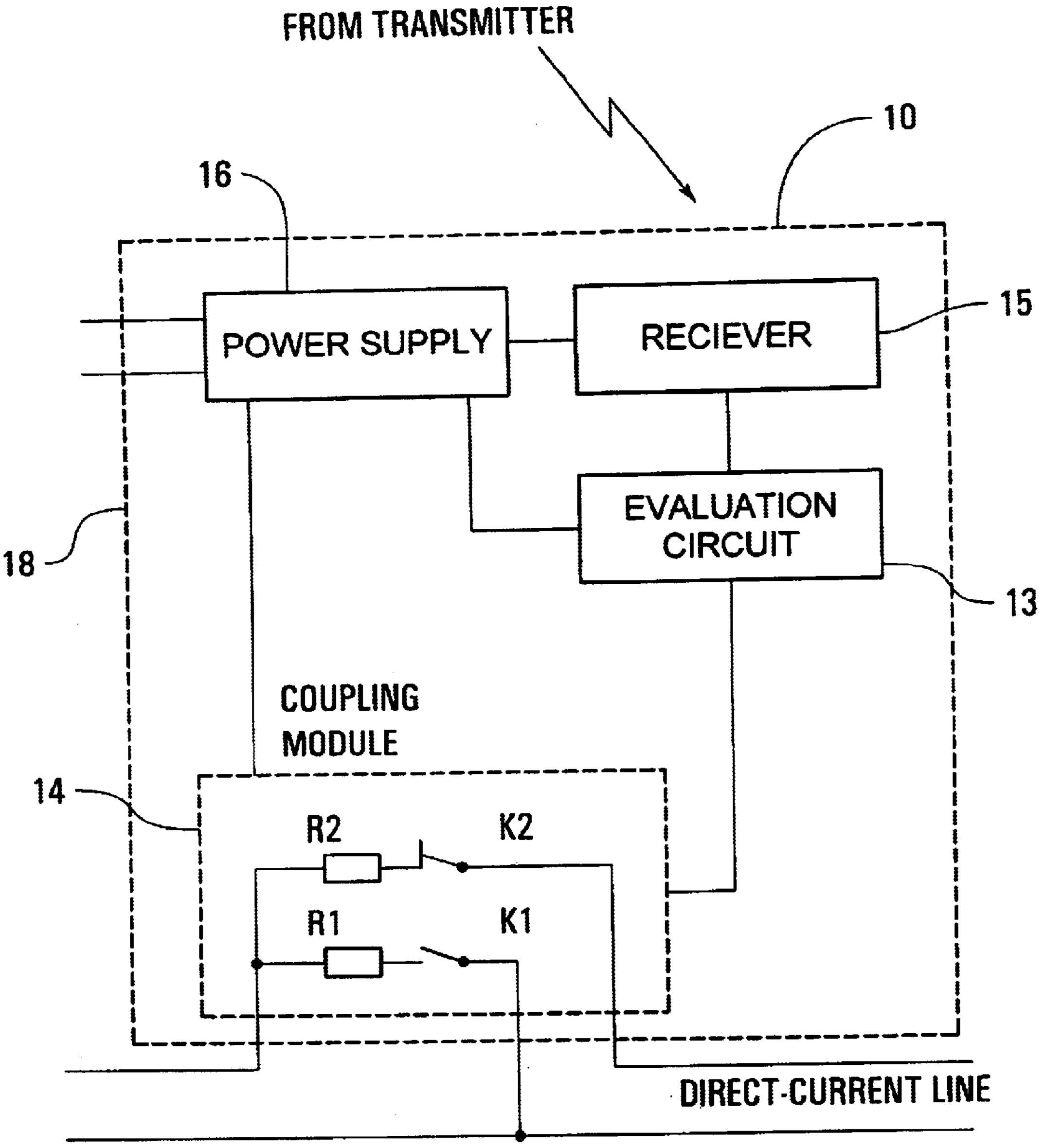
FIG. 2 shows the schematic set-up of a relay station for radio-operated fire alarm boxes for connection to a direct-current operated communication pathway.

Referring to FIG. 2, a relay station 10 is schematically shown. It has a receiver 15 for the radio signal arriving from the transmitter of an alarm box, and a monitoring and signal evaluation circuit 13 for the radio signal. A power supply unit 16 feeds the receiver 15 and the evaluation circuit and also a coupling module 14 which will be described later. Power supply 16 may be either from a network or via a battery. An alarm signal received from the receiver 15 is processed in the evaluation circuit 13 and is provided to the coupling module.

A direct-current line is connected to the control centre (not shown) of the fire alarm system and has two conductors. Connected to the conductors of the direct-current line is a series connection comprised of a resistor R1 and a switch K1. The switch K1 is normally opened. Another series connection connection comprised of a resistor R2 and a switch K2 is within the path of one of the two conductors. The switch K2 is normally closed.

The direct-current line has coupled thereto a plurality of fire alarm boxes (not shown) in a wire-bound manner. Communication between these fire alarm boxes and the control centre (not shown either) is performed by current signals, i.e. a decrease in current or an increase in current. A multiplicity of wireless alarm boxes which establish a connection with the relay station 10 via the radio network, may be coupled to the relay station 10. If one of the alarm boxes (not shown) responds and emits an alarm signal which is transmitted to the relay station 10 via the radio network the monitoring circuit 13 causes a closure of the switch K1. This, in turn, causes an increase in current, and the control centre determines that there is a fire case in the area of the wireless communicating fire alarm boxes. It is impossible to identify the alarm box emitting the alarm signal.

If one of the fire alarm boxes, which can be coupled to the relay station 10 via the radio network, outputs an trouble signal the switch K2 will be opened. This is ascertained by the control centre and servicing personnel can help determine which of the fire alarm boxes emitting a trouble signal is affected by a malfunction.

As such, the coupling module 14 is a self-contained module which can be disconnectably connected to the components shown in FIG. 2, e.g. by appropriate plug-and-socket connections. Therefore, it may be substituted for by another module as one is shown, for example, in FIG. 3.

Figure 3:
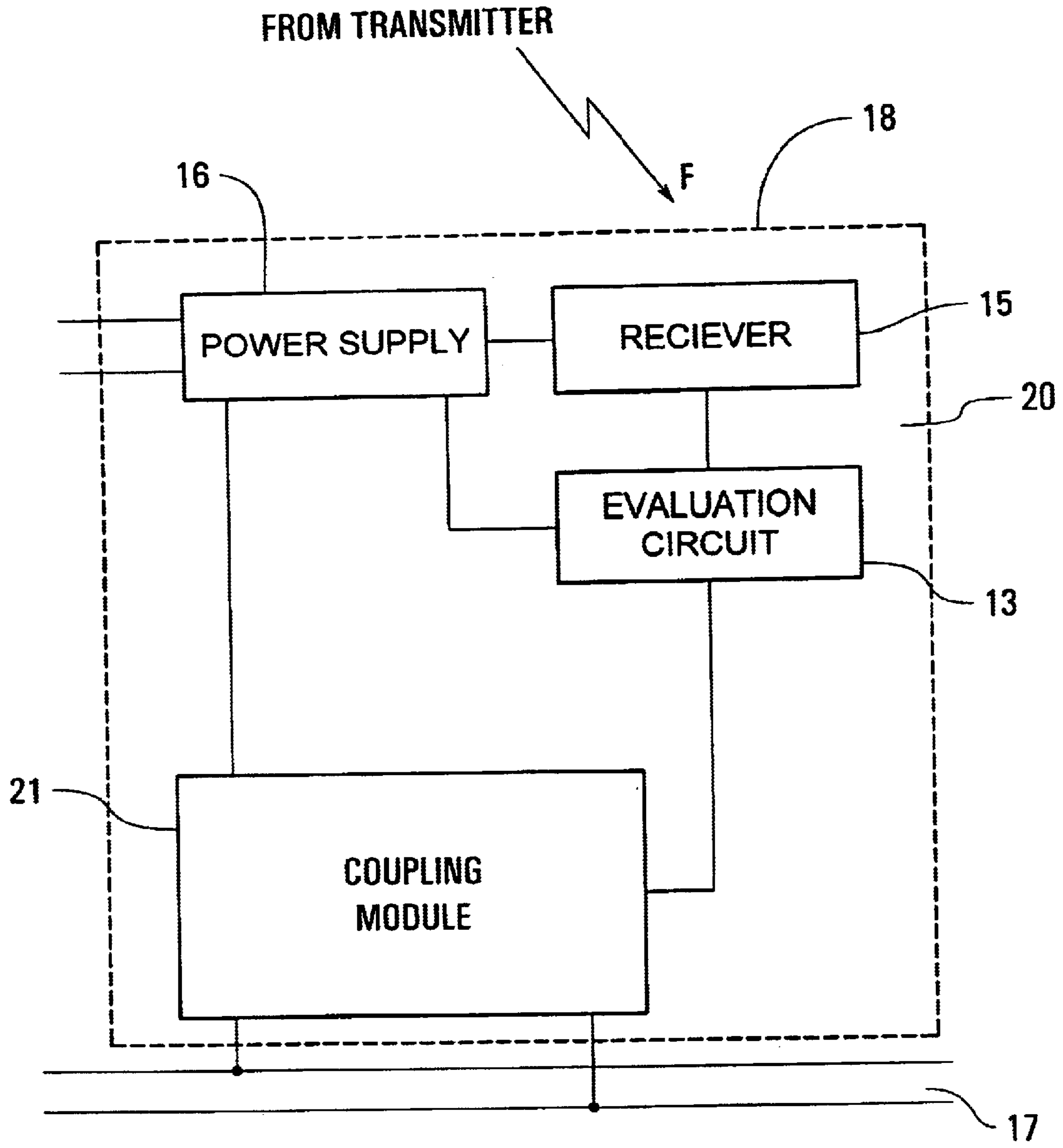
FIG. 3 shows the schematic set-up of a relay station for connection to a communication pathway designed as a data bus.

The relay station 20 of FIG. 3, except for the coupling module 21, has the same components as the relay station 10. That is, it includes the receiver 15 and the evaluation circuit 13, and the power supply unit 16. The coupling module 21 has taken the place of the coupling module 14 because a connection needs to be made to a data bus 17. The data bus, in a known manner, makes possible the communication of the control centre to the wire-bound alarm boxes, on one hand, and the relay station 20 via digital data words, on the other. It is understood that this communication may also be bidirectional if a transmitter and receiver each are provided in the radio-operated alarm boxes and the relay station 20.

It is understood that the connections between the data bus 12 and the set-up of the relay station 20 may be fixed wire connections with possibilities for connection within the box 18 shown in FIG. 2 or FIG. 3 which, for example, may constitute a housing for the components. For example, plug-and-socket contacts or easily disconnectable contacts are provided in the box 18 for connection to the respective coupling module, which selectively is the coupling module 14 or the coupling module 21 here. However, it is understood that as many different coupling modules may be provided as communication systems are distributed in fire alarm systems.

The coupling module 21 is designed so as to convert the signal arriving from the evaluation circuit 13 into an appropriate data word in order that it may be transmitted to the control centre over the data bus 17. Accordingly, a malfunction may also be transmitted, in which case the control centre is also capable of identifying the alarm box from which a signal has been emitted. It is understood that communication may also be effected in the opposite direction under the above conditions and, thus, the control centre may interrogate the individual alarm boxes for their states.

Figure 4:
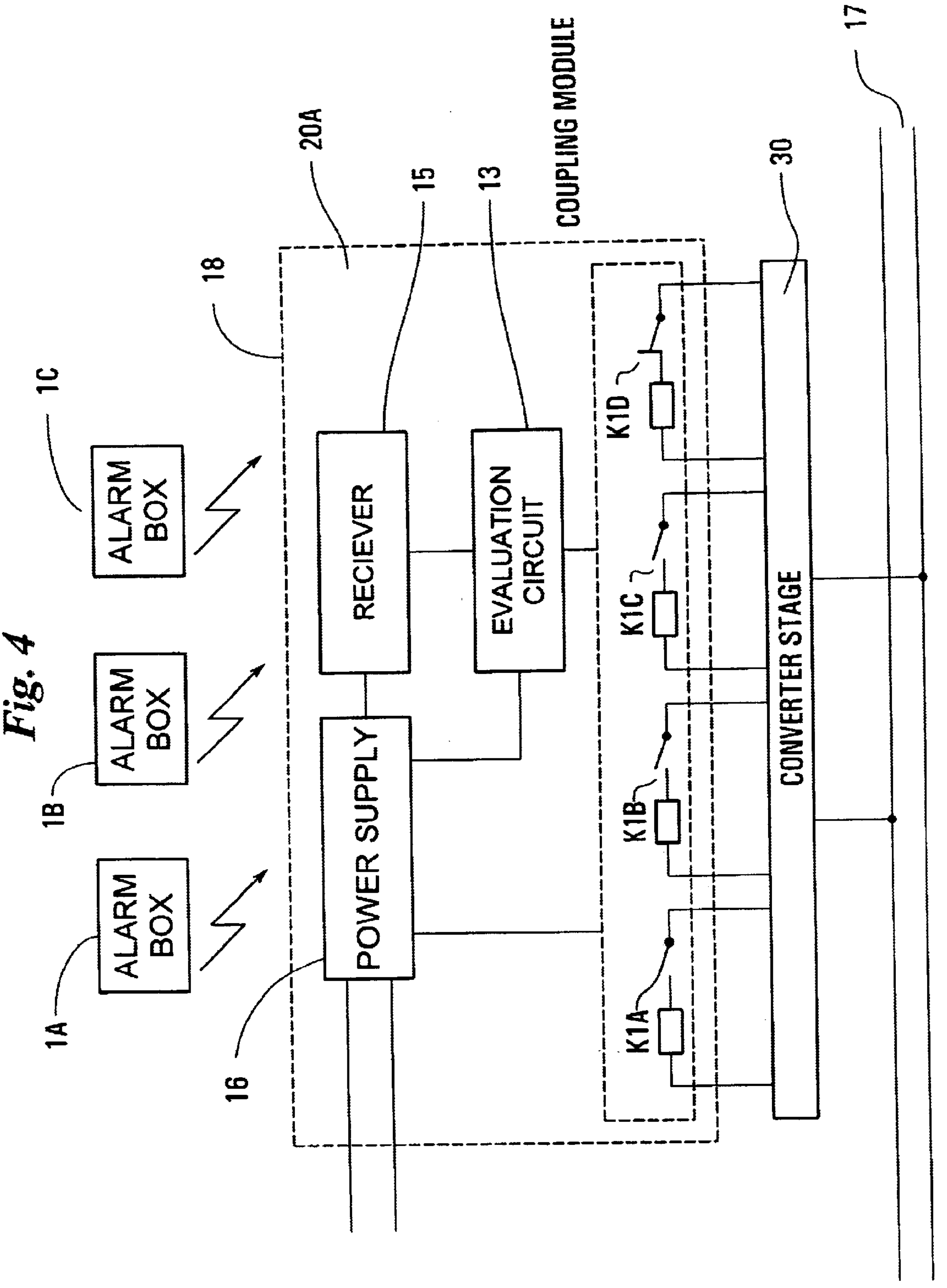
FIG. 4 shows a particular aspect of a relay station.

Referring to FIG. 4, three radio-operated alarm boxes 1A, 1B, and 1C are shown. They are adapted to transmit signals to the relay station **20*a* via the radio network. The relay station 20*a*, in turn has a receiver 15, an evaluation circuit 13, and a power supply unit 16 comparable to that of the relay stations 10 and 20. In lieu of a coupling module 14 or 21 of FIGS. 2 and 3, a module 22 is provided which has three switches K1A, K1B, and K1C each of which are in series with a resistor which is not designated. The lines leading to the switches are led out of the housing 18 and, via appropriate plug-and-socket connections, for example, may be metallically connected to a stage 30 which is designed so as to convert the response of one of the switches mentioned into an appropriate data word for the data bus 17. The switches K1A to K1C are associated with the alarm boxes 1A to 1C, i.e. if the alarm box 1B outputs an alarm signal, for example, the switch K1B will close. Since the switches K1A to K1C are appropriately associated in the stage 30 the data word which is formed in the stage 30 for the data bus 17 receives an information on that it was the switch K1B which has closed and, hence, the information that the alarm box 1B** has emitted an alarm signal.

Another switch K5, which is in series with a resistor which is not designated, is also connected to the stage 30, and the stage 30 produces a data word corresponding to a malfunction with an address for the bus 17 if one of the alarm boxes 1A to 1C provides a trouble signal to the relay station **20*a***.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A fire alarm system, comprising:

a control centre, a wire-bound communication pathway (17) connected to the control centre, a relay station (10, 20, **20*a*) connected to the communication pathway (17), the relay station having a receiver (15) and a signal evaluation circuit (13), first decentralized alarm boxes which are connected to the communication pathway (17) in a wire-bound manner, second decentralized alarm boxes (1, 1A, 1B, 1C) which are adapted to be coupled to the receiver (15) of the relay station (10, 20, 20*a*) via a wireless channel where the first and second alarm boxes, in case of fire, produce an alarm signal which is transmitted to the control centre via the communication pathway (17) by means of a predetermined communication mode, a set of separate different coupling modules (14, 21, 22, 30) which are disconnectably disposed in the relay station (10, 20, 20***a*) and are adapted to be connected to the signal evaluation circuit (13) and the communication pathway (17) via appropriate connecting elements with the coupling modules being designed for different communication modes.

2. The fire alarm system according to claim 1, characterized in that the coupling modules (14, 21, 22, 30) are adapted to be connected to the signal evaluation circuit (13) and, in case of need, to a power supply unit (16).

3. The fire alarm system according to claim 1, characterized in that the coupling modules (14, 21, 22, 30) are adapted to be connected mechanically and disconnectably to the signal evaluation circuit (13).

4. The fire alarm system according to claim 1, characterized in that the communication pathway is a direct-current line or a bus and the coupling module is a communication module for the connection of push-button fire alarm boxes to the direct-current alarm line or fire alarm buses.

5. The fire alarm system according to claim 4, characterized in that the coupling module (14) has a series connection which is comprised of a resistor (R1) and a switch (K1) and is connected between the conductors of the communication pathway wherein the coupling module (14) closes the switch (K1) if the signal evaluation circuit (13) produces an alarm signal.

6. The fire alarm system according to claim 5, characterized in that the coupling module (14) has disposed therein a second series connection which is comprised of a resistor (R2) and a switch (K2) and which is arranged within the path of a conductor of the communication pathway, and that the switch (K2) of the second series connection closes when it receives a trouble signal from the signal evaluation circuit (13).

7. The fire alarm system according to claim 1, characterized in that the communication pathway is a data bus (17) and the coupling module (21) converts the signals received from the evaluation circuit (13) into respective digital data words in the communication mode of the data bus (17).

8. The fire alarm system according to claim 7, characterized in that the coupling module is composed of two stages (22, 30) the first of which is connected to the evaluation circuit (13) and has a series of normally opened switches (K1A to K1C) each of which is associated with a decentralized second alarm box (1A to 1C) and the second stage (30) of which is connected to the communication pathway designed as a data bus, and which produces a digital signal on the communication pathway upon closure of a switch (K1A to K1C).

9. The fire alarm system according to claim 8, characterized in that the first stage (22) has a normally closed switch (K5) which is also connected to the second stage (30) and is opened if one of the second alarm boxes (1A to 1C) provides a trouble signal to the relay station (20*a*), whereupon the second stage (30) produces a digital trouble signal.

10. A fire alarm system, comprising:

a control centre, a first wire-bound communication pathway (17) connected to a first connection of the control centre, a second wire-bound communication pathway connected to a second connection of the control centre, a relay station (10, 20, 20*a*) connected to the second communication pathway (17), the relay station having a receiver (15) and a signal evaluation circuit (13), first decentralized alarm boxes which are connected to the first communication pathway (17) in a wire-bound manner, second decentralized alarm boxes (1, 1A, 1B, 1C) which are adapted to be coupled to the receiver (15) of the relay station (10, 20, 20*a*) via a wireless channel where the first and second alarm boxes, in case of fire, produce an alarm signal which is transmitted to the control centre via the first and second communication pathways (17) by means of a predetermined communication mode, a coupling module (14, 21, 22, 30) which is disconnectably disposed in the relay station (10, 20, 20*a*) and is adapted to be connected to the signal evaluation circuit (13) and the second communication pathway (17) via appropriate connecting elements with the coupling module being designed for the communication mode of the second communication pathway.

* * * * *